United States Patent
Bertheux et al.

(10) Patent No.: US 6,669,147 B2
(45) Date of Patent: Dec. 30, 2003

(54) DEPLOYABLE RADIATOR FOR A SPACE VEHICLE

(75) Inventors: Philippe Bertheux, Belbeze de Lauragais (FR); Emmanuel Texier, Cannes la Bocca (FR); Bernard Jacqué, Toulouse (FR); Jean-Marie Seguin, Toulouse (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/114,277

(22) Filed: Apr. 3, 2002

(65) Prior Publication Data

US 2002/0145082 A1 Oct. 10, 2002

(30) Foreign Application Priority Data

Apr. 5, 2001 (FR) .............................................. 01 04642

(51) Int. Cl.[7] ................................................ B64G 1/46
(52) U.S. Cl. ................................... 244/158 R; 244/163
(58) Field of Search ............................ 244/158 R, 163, 244/173, 158 A, 57; 165/274, 269, 291, 300; 361/676, 677, 678, 688, 689, 690, 699, 701, 702, 703, 704, 707, 714

(56) References Cited

U.S. PATENT DOCUMENTS

| | | | | |
|---|---|---|---|---|
| 3,603,530 A | * | 9/1971 | Easton et al. | 244/163 |
| 5,609,315 A | * | 3/1997 | Lepore, Jr. | 244/163 |
| 5,787,969 A | * | 8/1998 | Drolen et al. | 165/41 |
| 5,816,540 A | * | 10/1998 | Murphy et al. | 244/173 |
| 5,823,476 A | * | 10/1998 | Caplin | 244/158 R |
| 5,828,347 A | * | 10/1998 | Rossi et al. | 343/882 |
| 5,833,175 A | * | 11/1998 | Caplin | 11/98 |
| 5,839,696 A | * | 11/1998 | Caplin et al. | 244/159 |
| 6,003,817 A | * | 12/1999 | Basuthakur et al. | 244/158 R |
| 6,102,339 A | * | 8/2000 | Wu et al. | 244/173 |
| 6,196,501 B1 | * | 3/2001 | Hall et al. | 244/163 |
| 6,220,548 B1 | * | 4/2001 | Hyman | 244/158 R |
| 6,318,673 B1 | * | 11/2001 | Wolters | 244/158 R |
| 6,378,809 B1 | * | 4/2002 | Pon | 244/173 |
| 6,478,259 B2 | * | 11/2002 | Cordaro | 244/163 |

* cited by examiner

*Primary Examiner*—Charles T. Jordan
*Assistant Examiner*—Stephen A. Holzen
(74) *Attorney, Agent, or Firm*—Sughrue Mion, PLLC

(57) ABSTRACT

The invention provides a deployable radiator for a space vehicle such as a satellite. The radiator of the invention has two radiating faces, one of which is insulating over a portion of its area so that during launch and while the satellite is being moved onto station, with the radiator in the stored position, it naturally serves to keep the highest possible temperature on board the vehicle.

12 Claims, 12 Drawing Sheets

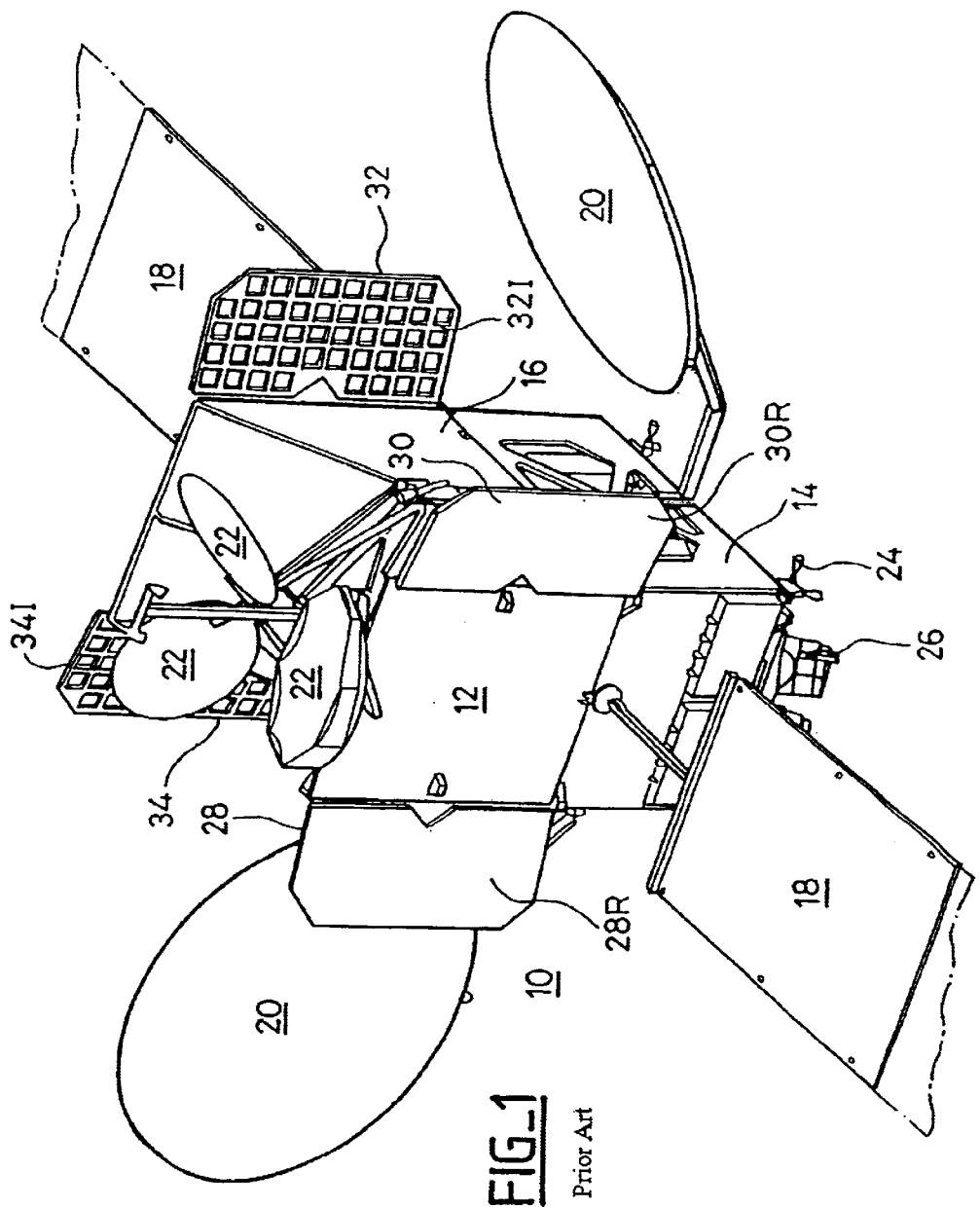
FIG_1
Prior Art

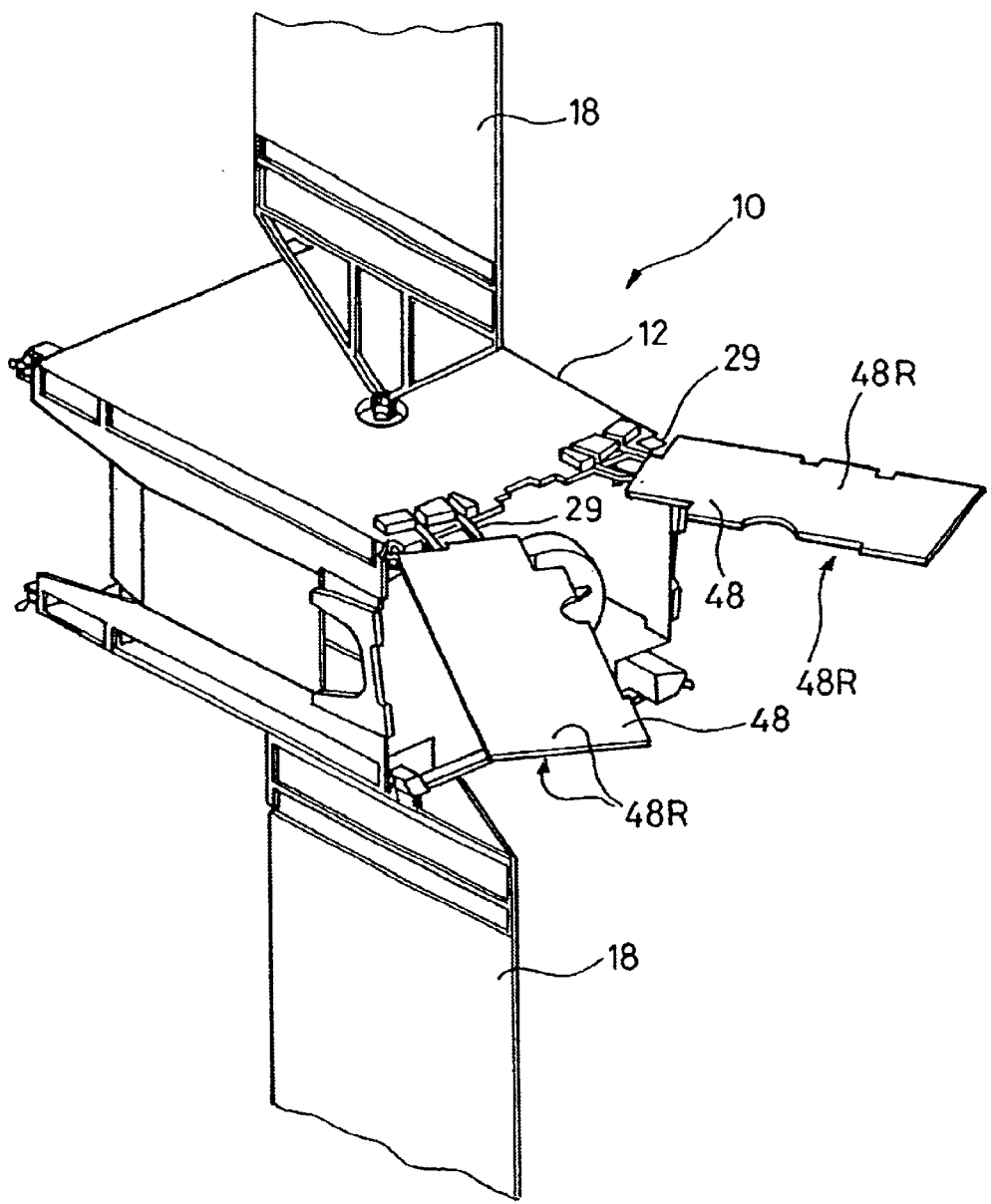
FIG_2
Prior Art

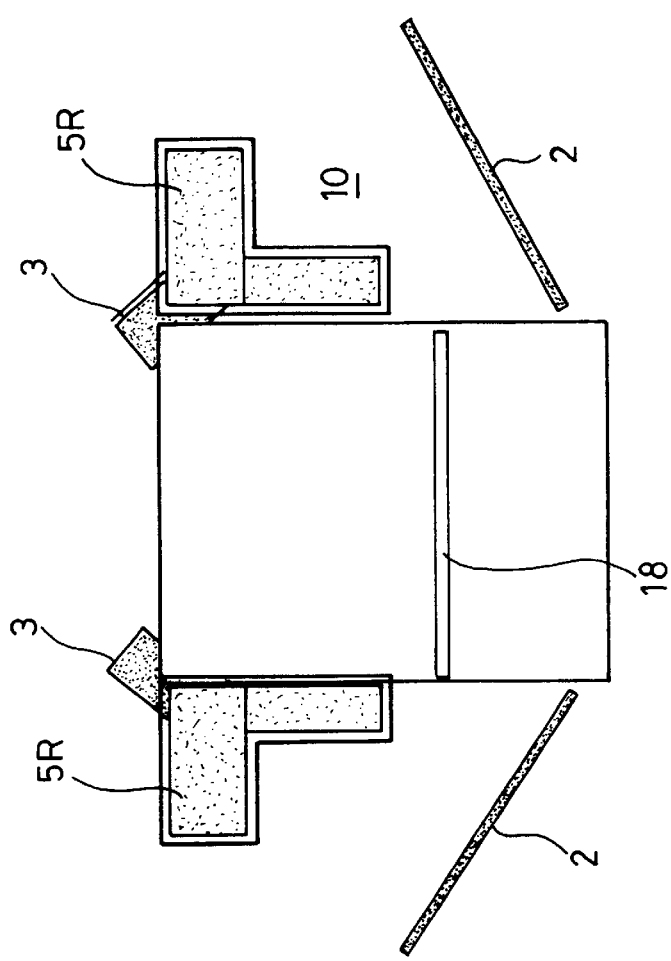
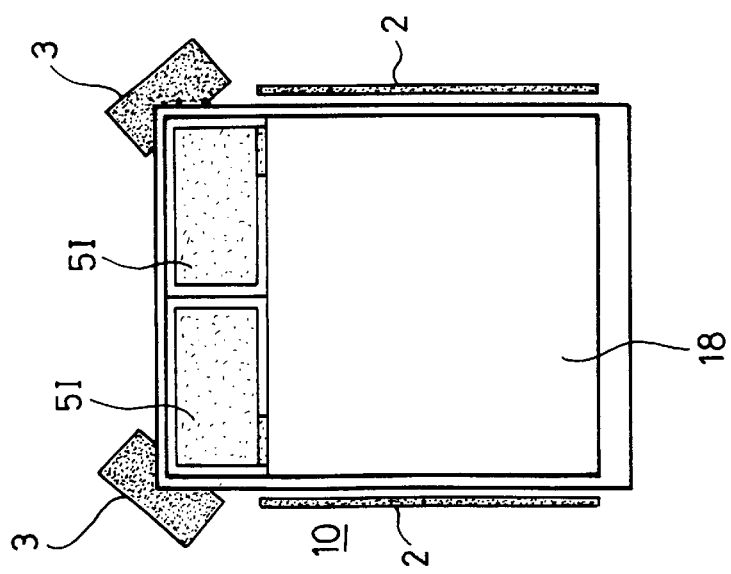
FIG._3b
FIG._3a

FIG_4a
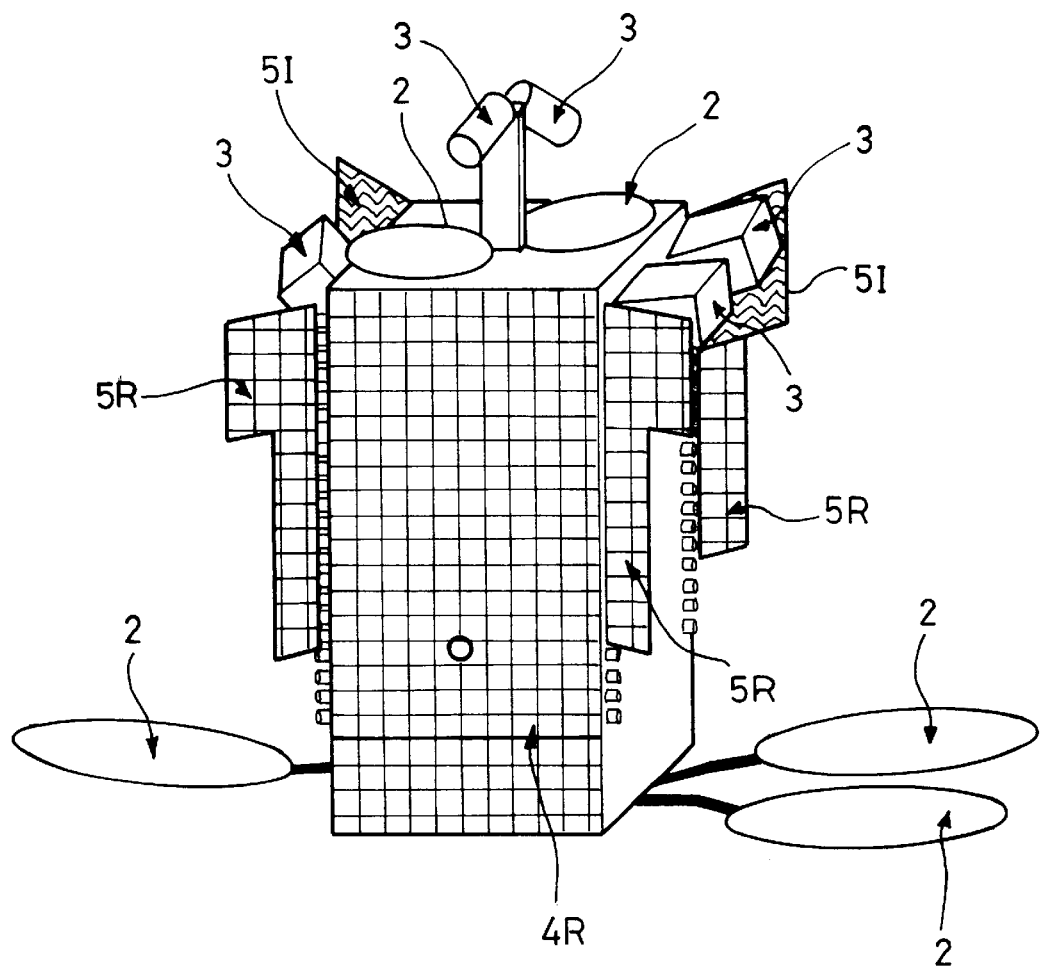
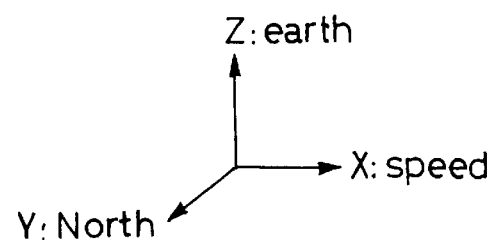

FIG_4b
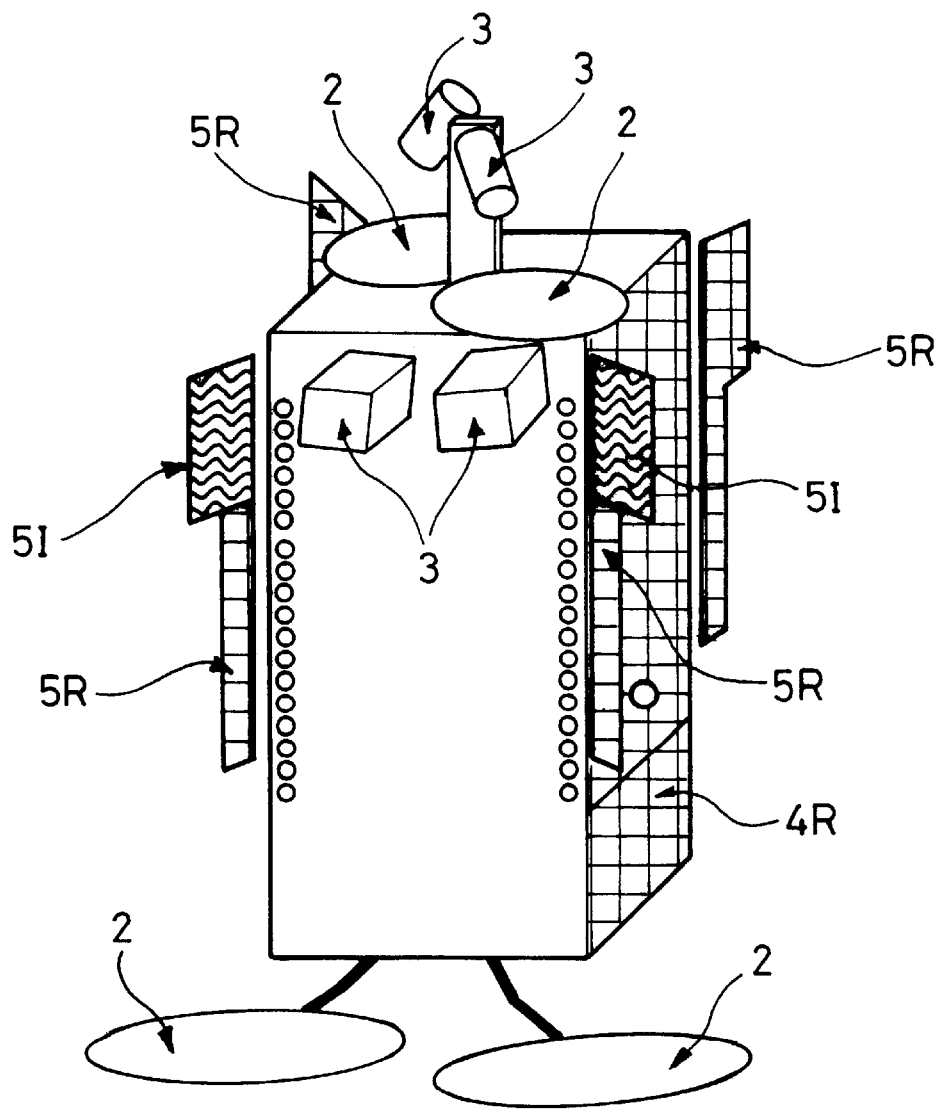
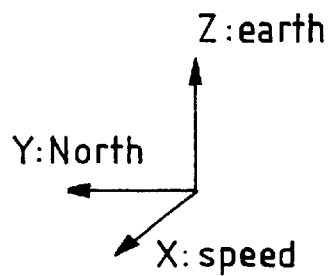

FIG_5
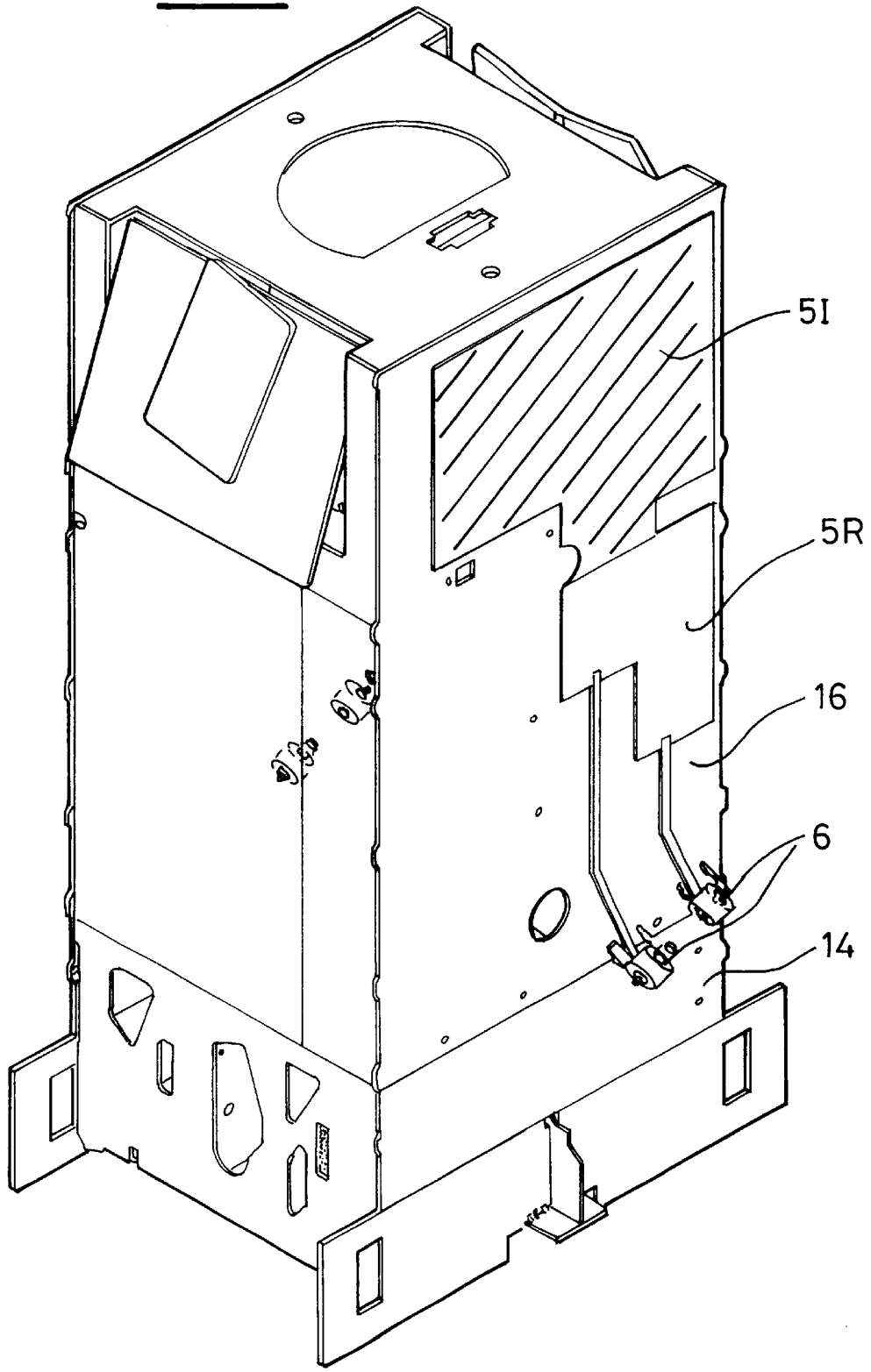

FIG_6
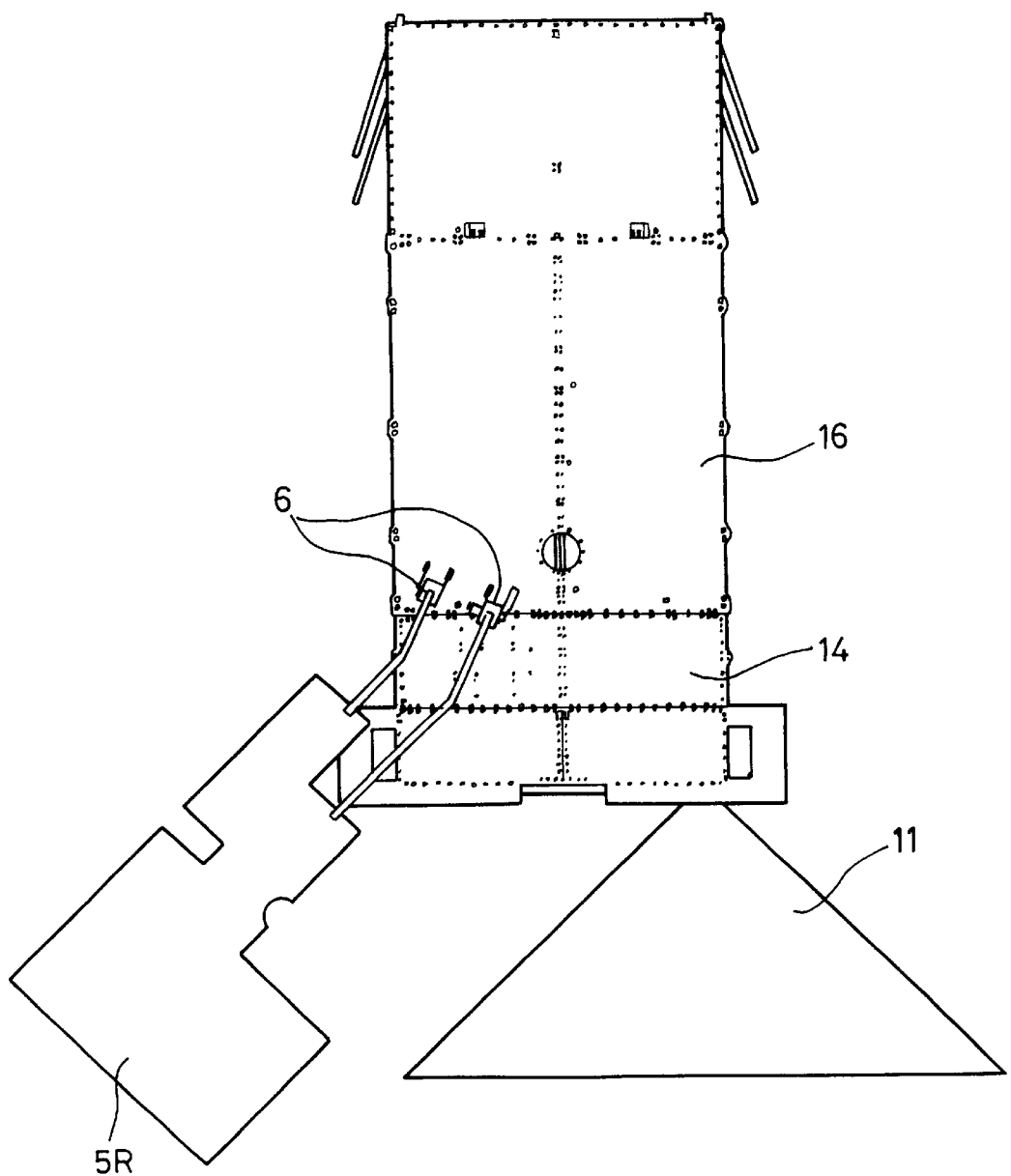

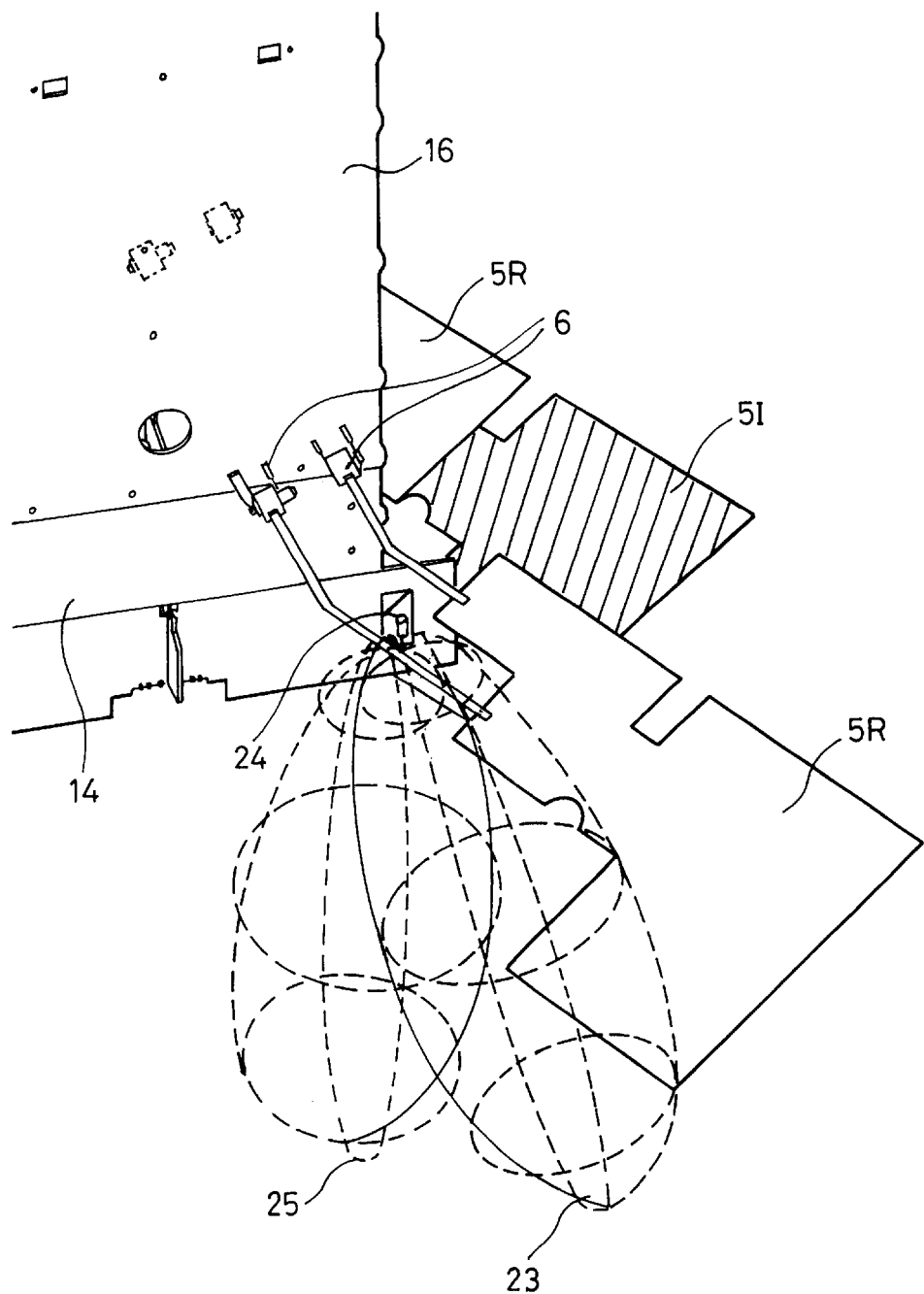
FIG_7

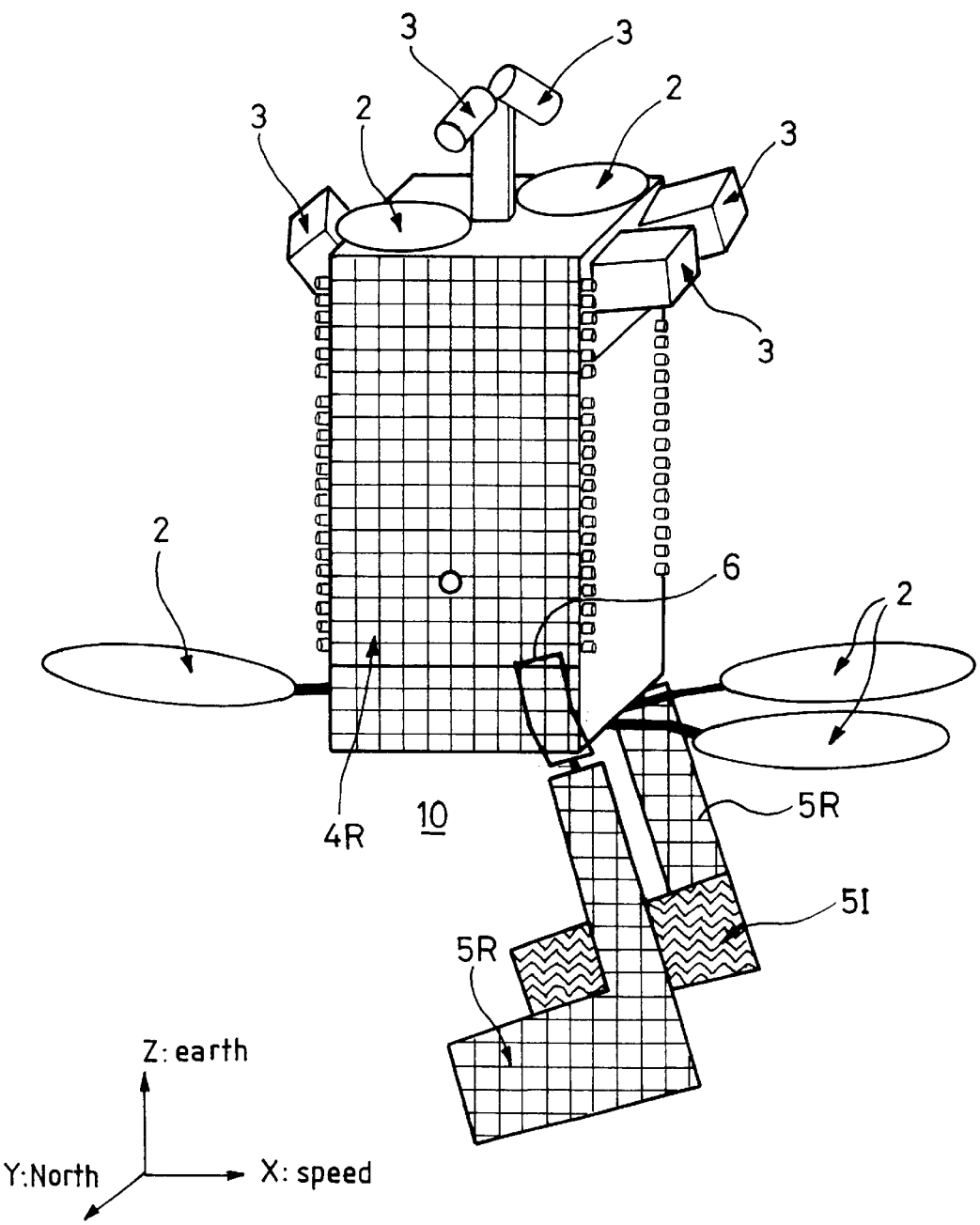
FIG_8a

FIG_8b
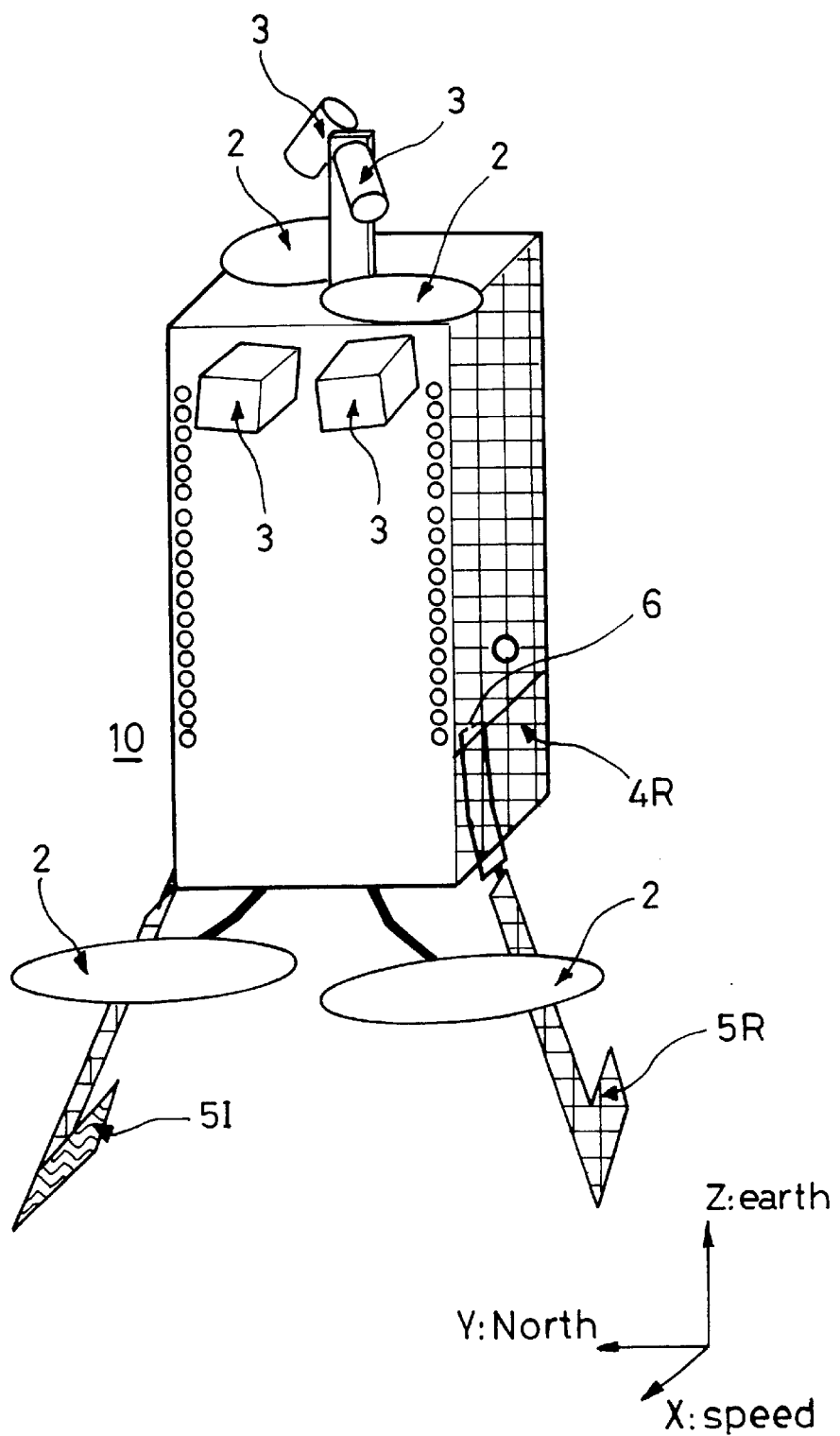

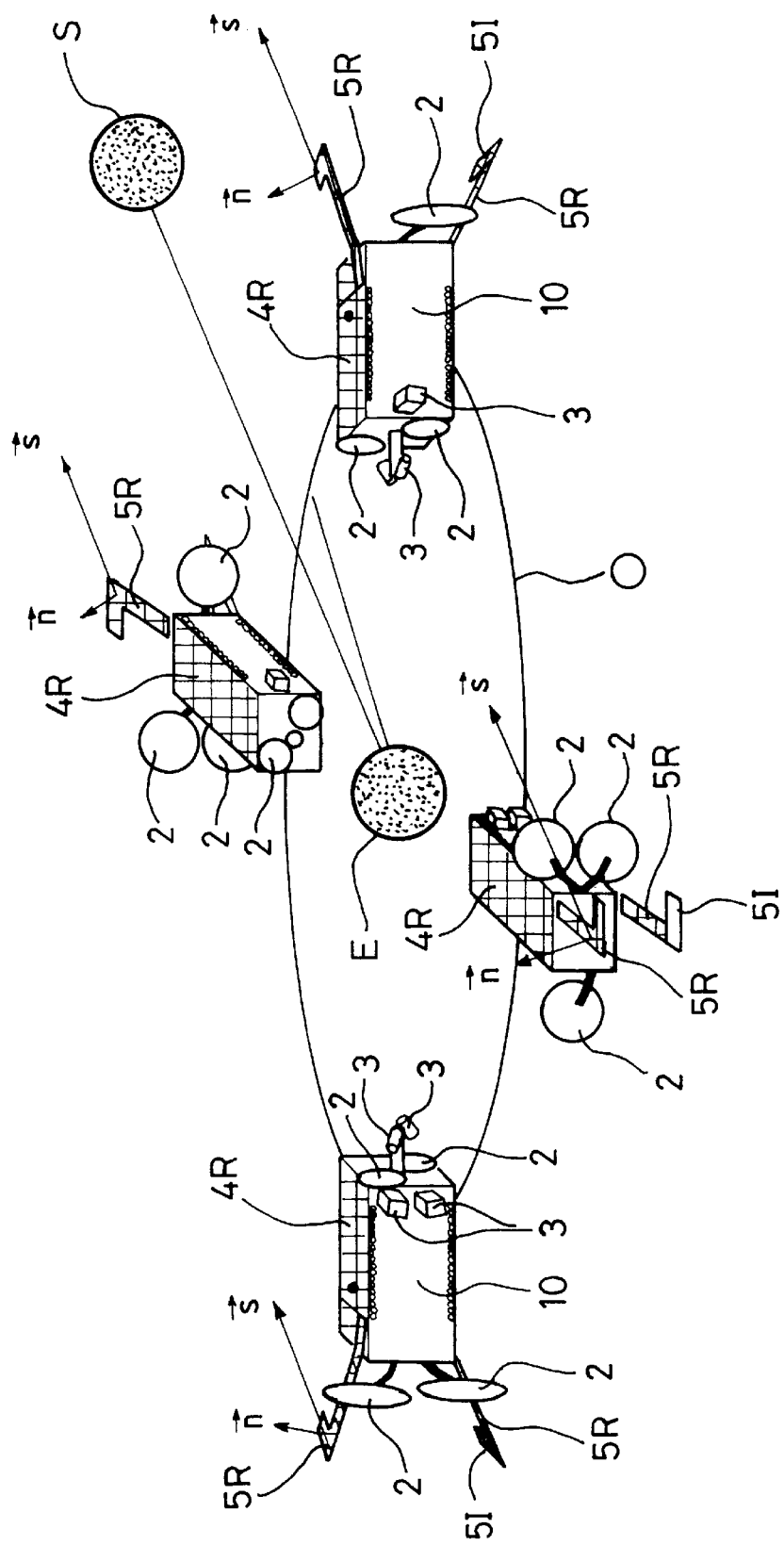

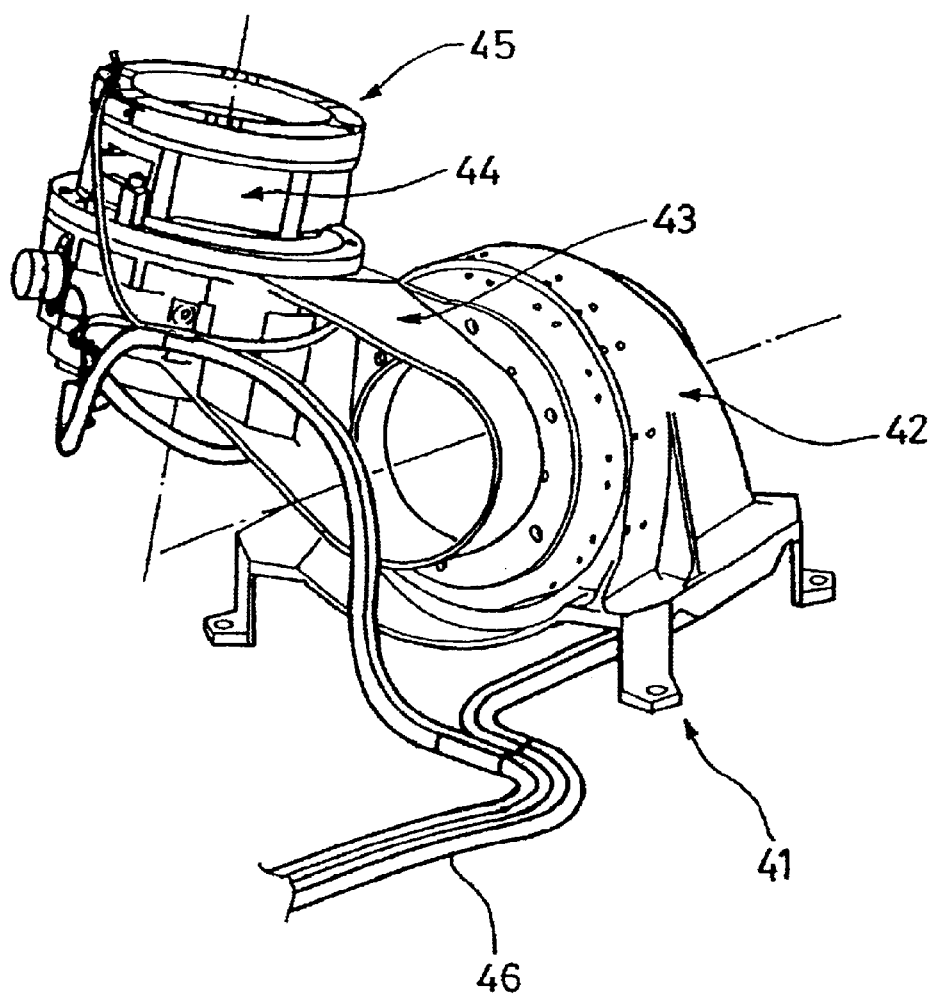
FIG_10
Prior Art

DEPLOYABLE RADIATOR FOR A SPACE VEHICLE

The present invention relates to space vehicles such as satellites and probes carrying electronic or optical payloads. Such vehicles are typically provided with means for generating, storing, and distributing electricity to power all of the on-board electronics. Depending on the electrical efficiency specific to each piece of electronic equipment, the equipment dissipates as heat a fraction of the electrical energy it consumes in operation. This heat must be distributed and channeled by conduction and must then be dumped from the space vehicle into the vacuum of space by radiation. The invention relates to heat radiators for performing this function.

BACKGROUND OF THE INVENTION

Various configurations of fixed or deployable radiators are known that are of dimensions which vary with the size and the electrical power of satellites. A present trend in telecommunications satellites is to have ever increasing dimensions and also to have power generators of ever increasing power, thus giving rise to a need for increased radiating areas on board satellites.

A radiator is more effective if it is not illuminated by the sun; thus, for geostationary satellites, the fixed radiators are generally installed preferably on those panels of the satellite structure which are exposed to the north and to the south once the satellite is orbiting in its operating position and the body of the satellite is oriented so as to point its antennas to the surface of the earth.

Deployable radiators are used when the fixed areas inherent to the structure of the satellite are not sufficient to dump all of the heat that is generated on board. Like other deployable structures such as solar generators, antenna reflectors, etc., deployable radiators are folded against the main structure of the satellite so as to lie within the volume that is available under the nosecone of the launcher. After launch, the satellite separates from the launcher once the nosecone has been ejected from the launcher, and the various deployable structures are deployed as the need arises in the mission by deployment mechanisms that are specifically adapted to each case.

When launching a geostationary satellite, the launch rocket typically puts the satellite onto an injection orbit known as a geostationary transfer orbit (GTO).

Thereafter, propulsion means on board a geostationary satellite enable it to be transferred from the injection orbit to its final orbital position on the geostationary arc known as the geostationary earth orbit (GEO).

At present, these propulsion means are generally constituted by one or more chemical-burning engines integrated in the satellite.

In a future generation of satellites, in order to increase the capacity and the lifetime of the satellite, it is envisaged to generalize the use of electric thrusters for putting satellites onto station and for keeping them on station. Such a thuster is powered by energy that is renewable, i.e. electricity picked up by means of the solar generators, thus making it possible to limit the drawbacks associated with on-board chemical fuels, such as their mass and the space required to store them.

A new generation of electrically-propelled satellites is thus being designed and made. For the sequencing involved in putting the satellite onto station, i.e. transfer from its injection orbit to its final orbital position on the geostationary orbit, various options are possible.

When using electrical propulsion to perform all or part of this transfer, it is necessary to collect solar energy so as to be able to convert it into electrical energy in order to power the electric thrusters. This can be done by deploying the solar generators of the satellite in part or in full. Or else, in other scenarios, the satellite can perform its transfer between its injection orbit and the geostationary orbit or a portion of this transfer using energy that was already on board at launch, whether in chemical, electrochemical (battery), or even nuclear form.

In all cases, the energy available for transfer is limited by the energy collection or storage means which must be dimensioned as sparingly as possible.

Thus, in all cases, since the available energy is only just sufficient, it must not be wasted insofar as that is possible during the transfer stage.

Document D1=EP 0 780 304 A1 discloses deployable radiators, each having two essentially parallel surfaces, comprising a radiating first face and an opposite second face that is insulating, so that during transfer from GTO to GEO the deployable radiators are in the stored position, pressed against the structure of the satellite, with their radiating faces facing towards the structure of the satellite and their insulating faces facing towards the vacuum of space in order to reduce the onboard heating requirements during this stage, thereby economizing on-board energy. That system is illustrated in FIG. 1 and is described in greater detail below.

Other deployable radiator systems are known in the prior art, e.g. from document D2=WO 99/19212, and the teaching thereof is described below with reference to FIG. 2. In that case the deployable radiators have two radiating faces.

The deployable radiators of document D1 are very effective for thermal insulation during the transfer stage towards the geostationary orbit from the injection orbit. In contrast, once the satellite is on-station in the geostationary orbit, their effectiveness as heat radiators is compromised by the fact that approximately half of the available surface area is insulating and not radiating.

The deployable radiators of document D2 are radiating over both faces in full, but they provide no thermal insulation during the transfer stage.

OBJECTS AND SUMMARY OF THE INVENTION

The deployable radiators of the invention enable the drawbacks of the prior art to be mitigated. To this end, the invention provides a deployable radiator for a space vehicle, the radiator having a stored position prior to deployment and an operational deployed position after deployment; said radiator having two main faces comprising a first face which is stored towards the vehicle and an opposite, second face which faces towards space in the stored position; said first face being radiating over at least the major portion of its area; at least a portion of said second face being thermally insulating; wherein a large portion of said second face is thermally radiating, said portion being substantially hidden prior to deployment of said radiator by other elements of said space vehicle that act as a screen during launch and during at least a portion of the transfer of said vehicle into the geostationary orbit.

According to an advantageous characteristic, said deployable radiator is connected to the structure of the vehicle by a deployment mechanism having a hinge with a hinge axis, wherein said axis is positioned at a non-zero angle relative to the main axes of the structure of said vehicle. In a particular embodiment, said hinge is fixed on a portion of said space vehicle referred to as a "communications module", which module is dedicated mainly to the on-board payload equipment. In an alternative embodiment, said hinge is fixed on a portion of said space vehicle referred to as a "service module", which module is dedicated mainly to the on-board equipment of the platform serving to support proper operation of the payload equipment.

In a preferred embodiment, when said radiator is in the established deployed position, it possesses at least one degree of freedom about at least one axis. In another embodiment, when said radiator is in the established deployed position, it possesses at least two degrees of freedom about at least two axes. In a particular embodiment, the main axis of said radiator in the deployed position is not parallel to a main axis of said vehicle. In another particular embodiment, the main plane of said radiator in the deployed position is not parallel to a main plane of said vehicle.

BRIEF DESCRIPTION OF THE DRAWINGS

Other characteristics and advantages of the invention and its main variants will appear on reading the following detailed description made with the help of the accompanying figures, in which:

FIG. 1, mentioned above, shows deployable radiators known in the prior art and having one face that is thermally insulating;

FIG. 2, mentioned above, shows deployable radiators known in the prior art and having both faces that are fully radiating;

FIGS. 3a and 3b are diagrammatic plan views of a first embodiment of deployable radiators of the invention shown in position stored against the structure of the space vehicle in FIG. 3a, and shown deployed in FIG. 3b;

FIGS. 4a and 4b are two perspective views showing a space vehicle provided with the deployable radiators of FIG. 3, and shown in the deployed position;

FIG. 5 shows another embodiment of a deployable radiator of the invention in its storage position;

FIG. 6 shows the FIG. 5 deployable radiator in its deployed position, in association with the field of view of an on-board instrument;

FIG. 7 shows the FIG. 5 deployable radiator in its deployed position in association with the jets from the chemical propulsion nozzles of the vehicle;

FIGS. 8a and 8b show two FIG. 5 deployable radiators in the deployed position, in perspective as seen from two different viewpoints, and shows their relationship with the mission antennas;

FIG. 9 shows how a vehicle of the kind shown in FIGS. 8a and 8b changes position on its orbit around the earth; and FIG. 10 shows a mechanism for obtaining rotation about two axes.

MORE DETAILED DESCRIPTION

In all the figures, the same references refer to the same elements. The scale is not always the same for reasons of clarity and legibility.

FIG. 1 shows a satellite 10 known in the prior art from document D1. The satellite 10 mainly comprises a service module 14 and a communications module 16. Deployable radiators 28, 30, 32, and 34 are shown in the deployed position.

The heat to be dumped which comes from equipment fixed within the structure 12 of the satellite 10 is conveyed to the radiators by means of heat pipes (not shown) each having a flexible portion corresponding to the hinge(s) for fixing the deployable radiators to the structure 12 of the satellite.

Various pieces of propulsion equipment are provided to maneuver the position of the satellite, both during stages in which the satellite is transferred from one orbit to another, and during the mission of the satellite for the purpose of keeping the satellite on station. In FIG. 1, there can be seen two pairs of chemical propulsion engines 24 on the ends of the "anti-earth" panel of the service module 14, together with a pair of electrical ion thrusters 26. Various motors of both types are provided, but they are not all visible in this figure because of the perspective. It is also possible to have a large central engine (not shown) for burning liquid or powder fuels, for driving transfer from the injection orbit to the geostationary orbit.

In FIG. 1, other deployed equipment can be seen such as solar panels 18 and large antenna reflectors 20. In the example of FIG. 1, the large reflectors 20 face primary reflectors 22, themselves facing primary antenna sources.

In order to understand the invention better, it is the different natures of the two faces of each deployable radiator that should be noted in FIG. 1. Each deployable radiator 28, 30, 32, and 34 in this example of the prior art has a radiating first face marked by the reference "R" and an opposite second face that is insulating and marked by the reference "I" following the numerical reference (28, 30, 32, 34) of each radiator, e.g. 28R, 30R, 32I, 34I. The radiating and insulating properties are obtained in conventional manner using coatings that are well known to the person skilled in the art, e.g. multilayer insulation (MLI) on the insulating face; and reflecting and radiating coatings known as optical solar reflectors (OSR) on the radiating faces.

The prior art space vehicle 10 taught by document D2 and shown in FIG. 2 comprises a structure 12 having solar panels 18 and deployable radiators 48 which are connected to the structure 12 of the vehicle 10 by respective deployment mechanisms each having a hinge 29 and a hinge axis, each hinge axis being at a non-zero angle relative to the main axes of the structure 12 of said vehicle 10. As shown in FIG. 2, both faces of the deployable radiators are radiating and are marked as such by the reference "R" on both faces, following the reference 48 designating the radiators. Once deployed, the main plane of the radiators is in the plane of the stationary faces of the satellite that look north or south, with the main axis of the radiator presenting a non-zero angle relative to the satellite-earth axis.

FIG. 3a is a diagrammatic plan view of a first embodiment in accordance with the invention of a deployable radiator 5 for a space vehicle 10, the radiator being shown in it stored position. The antenna reflectors 2 are folded against the body of the satellite on its east and west panels. The antenna sources 3 can be seen at the top of the figure which, by convention, is the earth face. The deployable radiators 5 are folded in this example against the north and south faces of the satellite 10. In the embodiment shown in FIGS. 3a and 3b, these deployable radiators are hidden in part by solar panels 18, themselves folded against the satellite when in the storage position. A fraction of the deployable radiators 5 that is not hidden by some other deployable equipment is insulating, and this is shown by the reference "I" following the reference "5", indicating "insulation". However, the hidden portion is a radiating portion but is not visible in this drawing showing the storage position.

FIG. 3b shows the same vehicle as FIG. 3a, but in the deployed position. The solar panels 18 can be seen edge-on in this view. When the normal to the panels is approximately perpendicular to the earth-satellite direction, the radiators 5 can be deployed. It can be seen that these radiators possess one face that is entirely radiating, given the reference "R" following the reference "5".

It will readily be understood that the main advantage of the invention over the prior art of FIG. 1 lies in the fact that according to the teaching of document D1 for a given deployable radiator area, half the area of said radiator is insulating, so only half is radiating; whereas with a deployable radiator of the invention it is possible for the radiating area to comprise much more than half. The radiator of the invention thus provides better performance for given area when it comes to dumping heat than does the radiator of document D1.

It will also be readily understood that the main advantage of the invention compared with the prior art of FIG. 2 stems from the fact that the deployable radiators of document D2 are completely radiating on both faces, which means that during the launch and transfer stages, the vehicle is exposed to the cold of space without insulation. A fraction of the on-board energy must therefore be devoted to heating the vehicle during its transfer, to the detriment of the energy required for implementing other functions, for example certain thrust means necessary for transfer purposes.

The invention thus makes it possible simultaneously to optimize the use of on-board energy during the transfer stage and the radiating capacity of the deployed radiators once the vehicle is on station, and throughout its mission.

FIGS. 4a and 4b are diagrams showing the same satellite as FIGS. 3a and 3b, but in perspective. The view of FIG. 4a is looking at the north face of the satellite, while the view of FIG. 4b is looking at its east face. The same elements can be seen in both figures: the antenna sources 3, the antenna reflectors 2, the fixed radiators 4R, and the deployable radiators 5, with a first face 5R that is entirely radiating and that is folded against the fixed radiator 4R in the stored position, and a second face having an insulating portion 5I and a large second portion 5R that is thermally radiating. During the orbit transfer stage, this radiating second portion 5R of the second face of said radiator is hidden by some other deployable piece of equipment, for example by the solar panels (not shown), or indeed by the reflectors of the deployable antennas, or any other equipment that has no need to be deployed during the transfer stage.

FIG. 5 shows another embodiment of a deployable radiator of the invention, in the stored position. There can be seen a radiator that is larger than in the preceding figures, but that has the same characteristics. A first face which is a radiating face and not visible in the drawing is placed against the north face of the communications module 16. The second face of the radiator comprises a first portion 5I that is thermally insulating and a second portion 5R that is thermally radiating, said radiating second portion being substantially hidden by other deployable elements (not shown) that constitute a screen while the vehicle is on its transfer path. The radiator is connected to the communications module 16 via a hinge 6 having a hinge axis. As shown in the drawing, the hinge axis is positioned with a non-zero angle relative to the main axes of the vehicle. The non-zero angle makes it possible for the radiator in the deployed position to be positioned outside the fields of view of sensors and outside the paths of the chemical or ion jets from the thrusters, and where appropriate also outside the radiation fields of the antennas, their reflectors, and their sources. This arrangement is shown in greater detail in the following figures.

FIG. 6 is a diagrammatic plan view of the deployable radiator 5R of FIG. 5 in its deployed position. The hinge 6 is mounted on the communications module 16 and the axis of the hinge 6 is positioned with a non-zero angle relative to the main axes of the vehicle. The field of view of a sensor is represented in the drawing by a triangle referenced 11. By way of example the sensor can be a position sensor for sensing a star. It can be seen that the positioning of the hinge axis so that its angle is non-zero relative to the main axes of the vehicle makes it possible for the radiator to be deployed outside the field of view 11 of the position sensor. Deployment bringing the main plane of the radiator into a position so that it is not colinear with the fixed planes of the north and south faces of the satellite also contributes to this task.

Furthermore, in order to make it easier industrially to produce numerous vehicles that include deployable radiators of the invention, it is desirable to design the vehicle so that its components are modular, e.g. a service module 14 and a communications module 16. In the most commonly-encountered circumstance, the on-board sources of heat are concentrated in the communications module 16; it is therefore logical to provide for the hinge 6 to be fixed on the communications module 16 and to provide for heat to be conducted from the communications module to the deployable radiator via one or more flexible heat pipes or fluid loops (not shown) passing through the hinge 6.

In another embodiment (not shown), it is possible to fix the hinge 6 on the service module 14, which could be of a single design for use with a variety of different communications modules for use in a range of satellites.

FIG. 7 is a diagram showing a detail of deployable radiators in the deployed position on the anti-earth side of the vehicle. In this figure, there can be seen in the foreground the radiating face 5R of a first radiator that is deployable about hinges 6 on the east or west face of the vehicle, as in the example of FIG. 6, with the axis of the hinges occupying a non-zero angle relative to the main axes of the vehicle, and with a portion of a second deployable radiator fixed on the opposite face of the vehicle (north or south as the case may be), said second radiator presenting an insulating portion 5I and a radiating portion 5R as can be seen in FIG. 7. This figure also shows the envelopes of the paths 23 and 25 followed by the effluents from chemical jets of a thruster 24. It can be seen that the shape of the radiator 5R and its position relative to the vehicle, when it is deployed, serves to avoid combustion products being received on the radiator.

In FIG. 7, the jet 23 is shown in three dimensions, and its geometrical relationship with the radiator can be seen. This jet can be completely avoided by the radiator only if a main plane of said radiator when in the deployed position is not parallel with a main plane of said vehicle, as shown in FIG. 7.

FIGS. 8a and 8b are diagrammatic perspective views respectively of the north face and of the east face of a satellite having deployable radiators as shown in FIGS. 5, 6, and 7, with the radiators being shown in the deployed position. Since all of the references are identical to those shown in the preceding figures, a detailed description is not repeated here. It should be observed in particular in FIG. 8b that the main planes of the radiators when in the deployed position are not parallel to the main planes of the vehicle, for the reasons mentioned above.

FIG. 9 shows how the position of a vehicle 10 such as that shown in FIGS. 8a and 8b varies around its orbit O around the earth E. It can be seen that the sun S does not lie in the geostationary orbital plane O of the vehicle 10 around the earth E. As a result the angle at which the sun's rays fall on the satellite 10 and thus on its radiators 5R varies as a function of the position of the vehicle 10 on its orbit O and as a function of the season.

The efficiency of a radiator increases with decreasing exposure to the sun, i.e. with decreasing absorption of solar energy. The amount of solar energy that is absorbed varies as a function of the angle made by the incident solar rays with the radiating surface 4R, 5R. This variation can be expressed as a function of the scalar product n·s of a vector n normal to the radiating surface 5R by a vector s parallel to the sun's rays. With a deployable radiator being motor driven about at least one axis of rotation, this scalar product n·s can be minimized, thereby minimizing the amount of solar energy that is absorbed by the radiator, and thus optimizing its efficiency at dumping heat. With a radiator being motor driven about at least two axes, it can be arranged for the scalar product n·s to be kept at zero, thereby maximizing radiator efficiency.

FIG. 10 shows a mechanism enabling rotation to be driven about two axes. This type of mechanism is well known to the person skilled in the art. It comprises a bottom first fixing piece 41 containing an annular motor (not shown) for rotating an intermediate second piece 43 about a first axis 42. The piece 43 contains an annular second motor (not shown) for obtaining second rotation about a second axis 44 of a third piece 45 that constitutes an interface with the equipment to be turned. Cabling 46 serves to convey position symmetry signals from both motors and also to provide the power necessary to turn them. Such a two-axis mechanism installed between the structure of the satellite 10 and the deployable radiators, or indeed within a deployable radiator (at its interface between its deployment arm and the radiating panels) makes it possible to obtain a scalar product n·s of zero over the entire orbit O.

The invention described with the few embodiments above and the figures showing them is not limited in any way to those particular examples. For example, the shape of the radiators is shown as being L-shaped, but it would be easy to design other shapes to obtain an arrangement that is optimum for some particular vehicle, for example they could be triangular or they could have some other shape. The radiators are shown as being arranged on the edges of the structure of the satellite, or on the anti-earth face when in the deployed position, but it would be easy to devise other places for positioning them on the structure of the vehicle. The examples given relate mainly to satellites, but the invention can also apply to interplanetary probes, to manned space flights, or to any other space vehicle that requires additional heat dumping capacity.

What is claimed is:

1. A deployable radiator and a space vehicle, the deployable radiator mounted to the space vehicle, the radiator having a stored position prior to deployment and an operational deployed position after deployment; said radiator having two main faces comprising a first face which is stored towards the vehicle and an opposite, second face which faces towards space in the stored position; said first face being radiating over at least the major portion of its area; at least a portion of said second face being thermally insulating; wherein a large portion of said second face is thermally radiating, said large portion being substantially hidden prior to deployment of said radiator by other elements of said space vehicle that act as a screen during launch and during at least a portion of the transfer of said vehicle into its operational orbital position.

2. A deployable radiator according to claim 1, said deployable radiator being connected to the structure of the vehicle by a deployment mechanism having a hinge with a hinge axis, wherein said axis is positioned at a non-zero angle relative to the main axes of the structure of said vehicle.

3. A deployable radiator according to claim 2, wherein said hinge is fixed on a portion of said space vehicle referred to as a "communications module".

4. A deployable radiator according to claim 2, wherein said hinge is fixed on a portion of said space vehicle referred to as a "service module".

5. A deployable radiator according to claim 2, wherein said radiator, in the established deployed position, possesses at least one degree of freedom about at least one axis.

6. A deployable radiator according to claim 5, wherein said radiator, in the established deployed position, possesses at least two degrees of freedom about at least two axes.

7. A deployable radiator according to claim 1, wherein the main axis of said radiator in the deployed position is not parallel to a main axis of said vehicle.

8. A deployable radiator according to claim 1, wherein the main plane of said radiator in the deployed position is not parallel to a main plane of said vehicle.

9. The deployable radiator according to claim 1, wherein the space vehicle is a geostationary space vehicle.

10. The deployable radiator according to claim 1, wherein the deployable radiator is a thin panel with the first face on one side of the panel and the second face on an opposite side of the panel.

11. The deployable radiator according to claim 1, further comprising a heat pipe thermally coupling the deployable radiator to heat generating equipment within the space vehicle.

12. A deployable space vehicle radiator, comprising:

a thin panel having a first face on one side of the panel and a second face on an opposite side o the panel; and a hinge coupled to one end of the panel, the hinge configured to extend the radiator between a first position and a second position displaced from the first position; and wherein the first face has a radiating coating over at least the major portion of its area;

wherein at least a portion of the second face has a thermally insulating coating; and wherein a large portion of the second face has a radiating coating.

* * * * *